United States Patent [19]

Schneier et al.

[11] Patent Number: 6,099,408

[45] Date of Patent: Aug. 8, 2000

[54] METHOD AND APPARATUS FOR SECURING ELECTRONIC GAMES

[75] Inventors: Bruce Schneier, Minneapolis, Minn.; Jay S. Walker, Ridgefield; James A. Jorasch, Stamford, both of Conn.

[73] Assignee: Walker Digital, LLC, Stamford, Conn.

[21] Appl. No.: 08/775,588

[22] Filed: Dec. 31, 1996

[51] Int. Cl.[7] ........................................................ A63F 9/00
[52] U.S. Cl. .............................. 463/29; 463/42; 463/16; 463/22
[58] Field of Search .................................. 463/10, 11, 12, 463/13, 16, 17, 22, 25, 29, 40, 41, 42

[56] References Cited

U.S. PATENT DOCUMENTS

| | | |
|---|---|---|
| 3,548,174 | 12/1970 | Knuth . |
| 4,200,770 | 4/1980 | Hellman et al. .......................... 178/22 |
| 4,339,134 | 7/1982 | Macheel . |
| 4,652,998 | 3/1987 | Koza et al. ............................... 463/22 |
| 4,897,875 | 1/1990 | Pollard et al ............................ 380/21 |
| 5,136,642 | 8/1992 | Kawamura et al. ...................... 380/21 |
| 5,251,165 | 10/1993 | James, III ............................... 364/717 |
| 5,269,521 | 12/1993 | Rossides ................................... 463/22 |
| 5,317,637 | 5/1994 | Pichlmaier et al. ...................... 380/25 |
| 5,324,035 | 6/1994 | Morris et al. ............................ 273/139 |
| 5,397,133 | 3/1995 | Penzias ................................... 273/148 R |
| 5,398,932 | 3/1995 | Eberhardt et al. ........................ 463/42 |
| 5,473,689 | 12/1995 | Eberhard ................................... 380/23 |
| 5,474,294 | 12/1995 | Sandeen . |
| 5,507,489 | 4/1996 | Reibel et al. ............................. 463/42 |
| 5,511,784 | 4/1996 | Furry ................................... 273/143 R |
| 5,557,518 | 9/1996 | Rosen . |
| 5,564,701 | 10/1996 | Dettor ...................................... 463/16 |
| 5,605,504 | 2/1997 | Huang ...................................... 463/22 |
| 5,643,086 | 7/1997 | Alcorn et al. . |
| 5,661,806 | 8/1997 | Nevoux et al. ........................... 380/25 |
| 5,772,509 | 6/1998 | Weiss ....................................... 463/16 |
| 5,779,545 | 7/1998 | Berg et al. ............................... 463/22 |

OTHER PUBLICATIONS

U.S. Patent No. 5,474,294 entitled, "Electronic Apparatus and Method for Playing a Game", issued to Lowell Sandeen on Dec. 12, 1995.

U.S. Patent No. 5,557,518 entitled, "Trusted Agents for Open Electronic Commerce", issued to Sholom S. Rosen on Sep. 17, 1996.

U.S. Patent No. 5,643,086 entitled "Electronic Casino Gaming Apparatus With Improved Play Capacity, Authentication and Security", issued to Allan E. Alcorn et al. on Jul. 1, 1997.

"Welcome to Global Games Online!", Global Games Corporation, (http://www.globalgames.com).

"Fujitsu Develops Random Number Generator HEMT IC", COMLINE Daily News Electronics, Feb. 15, 1990.

T. Swan, "The Chip–Is–Bad Fever; Random–number Generators; Algorithm Alley Column", Dr. Dobb's Journal of Software Tools, Jan., 1994, vol. 19; No. 1; at p. 111.

J.L., "How'd You Like to Get Paid to Hear an Ad Every Time You Make a Phone Call? Meet Seattle's Harry Hart III", Forbes, Jan. 3, 1994 at p. 76.

"Futuristic Advertising", The Commercial Appeal, Jan. 15, 1994 at p. 8A.

K. Bachman, "Interactive Doesn't Have to be Super Star Wars; Direct Marketing: Are We Ready for the Next Millenium?",Direct, Jun. 6, 1994 at p. 12.

(List continued on next page.)

*Primary Examiner*—Jessica J. Harrison
*Attorney, Agent, or Firm*—Dean Alderucci; Patrick J. Buckley

[57] ABSTRACT

A system for playing electronic games includes a game server and one or more player terminals. Game results are based on a random number generated in each of the game server and the player terminals. The game server and the player terminals cooperate to ensure that the random numbers are generated independently. As a result, game players and the game host, such as a casino, can be confident that play results are not fraudulent. In one embodiment, the random numbers are transmitted between the game server and the player terminals at substantially the same time. In other embodiments, the random numbers are encoded and exchanged between the game server and the player terminals. Then, keys to decode the random numbers are exchanged.

29 Claims, 20 Drawing Sheets

OTHER PUBLICATIONS

L. Jaffee, "FreeFone Network Expands Service; Novel Interactive Advertising Medium Targets Phone Customers", DM News, Jun. 6, 1994 at p. 12.

G. J.Chaitin, "Randomness and Mathematical Proof", Scientific American, May 1975 at p. 47.

Federal Way, Wash., Company's Online Casino Software May be Risky in America, Copyright 1996 Individual, Inc.

"Capstone Chip Technology", (http://bilbo.isu.edu/security/isl/cap.html), download date: Oct. 10, 1996.

PCT International Search Report for Application No. PCT/US97/23977 dated Jul. 20, 1998.

Jeremy Carl, "Online Casinos: Drawing to a Tough Hand", (www.webweek.com), Sep. 5, 1996.

"From Obscurity to the World's Largest Casino Using the Internet", (www.casino.org/casinol.htm), Feb. 1996.

| PLAYER ID NUMBER 261 | TRACKING NUMBER 262 | GAME SELECTED 263 | AMOUNT OF WAGER 264 | TIME OF WAGER 266 | TYPE OF WAGER 267 | GAME RESULT 268 |
|---|---|---|---|---|---|---|
| GB45921 | 4032XF | ROULETTE | $5.00 | 5:10 PM 05/07/97 | FIFTEEN RED | WIN $5.00 |
| HT21990 | 9724MR | BLACKJACK | $10.00 | 3:30 AM 05/08/97 | TWO HANDS | LOSE $10.00 |
| DL44087 | 8322PK | BLACKJACK | $15.00 | 3:35 AM 05/08/97 | ONE HAND | WIN $15.00 |

| PLAYER ID NUMBER 261 | SELECTION DATA TRACKING NUMBER 262 | GAME RESULT 268 | RESULT VALUE 269 | TIME OF RESULT 271 | PAYMENT STATUS 272 |
|---|---|---|---|---|---|
| GB45921 | 4032XF | WIN $5.00 | 34 | 5:15 PM 05/07/97 | PAYMENT COMPLETED |
| HT21990 | 9724MR | LOSE $10.00 | 234 | 3:32 AM 05/08/97 | PAYMENT DUE |
| DL44087 | 8322PK | WIN $15.00 | 876 | 3:37 AM 05/08/97 | AMOUNT UPDATED |

FIG. 2B

METHOD AND APPARATUS FOR SECURING ELECTRONIC GAMES

BACKGROUND OF THE INVENTION

The present invention relates to electronic games, and particularly to methods and devices for securing and ensuring the randomness of electronic or online games.

Various forms of electronic games of chance have been available for many years. The way these games are played, however, is changing dramatically with the use of digital computers operating on electronic networks such as the Internet. Players can now connect to a remote server and wager electronically.

Rather than traveling to a casino, a player can log into an electronic game and wager from the comforts of his own home. While this remote playing has many advantages, it raises several security issues. For example, when playing card games at a casino, a player can observe the dealer shuffle and deal the cards and thus has some confidence that the outcome was generated randomly. In an electronic casino, the shuffling process is typically digitally generated, driven by random number generators which the player cannot see. The player cannot know whether the random number generated is truly random or was selected by the casino to give it an advantage.

Electronic game providers have tried to increase players' confidence in the legitimacy of games by assuring players that gaming software has not been tampered with. For example, an electronic game provider may allow an independent third party to perform an audit of the software. This is a time-consuming and expensive process, however. With complex software running into the hundreds of thousands of lines of code, it is very difficult to find a few lines of code that alter the randomness of the outcomes. Also, use of an independent, third party auditor shifts the need for trust to another party, and does not guarantee the legitimacy of the game.

Some electronic lottery systems have subscribed to methods for securing communications between remote player terminals and a central controller. U.S. Pat. No. 4,652,998 to Koza, for example, describes cryptographic methods for securing these communications. In games dependent on the use of random numbers, however, simply securing the transmission of a fraudulent random number does not solve the problems inherent in the prior art.

Although there are many patents which describe the generation of random numbers, such as U.S. Pat. No. 3,548,174 to Knuth, they describe only methods for improving the statistical performance of random number generators.

SUMMARY OF THE INVENTION

Accordingly, the present invention is directed to systems and methods for ensuring the randomness of random numbers and authenticating the results of electronic games in a manner that substantially obviates one or more of the problems due to limitations and disadvantages of the related art. The present invention overcomes the limitations and disadvantages noted above by including in an electronic game system hardware and procedures to ensure that random numbers used to generate game results are truly random, independently-generated numbers.

To overcome the disadvantages of the prior art, and in accordance with the present invention, as embodied and broadly described, the invention includes an electronic game system comprising a game server and one or more player terminals. The game server includes a random number generator and a first transmitting device for transmitting a first random number to the one or more player terminals. The one or more player terminals includes a random number generator and a second transmitting device for transmitting a second random number to the game server. The system also includes hardware and procedures for ensuring that the first random number is generated independently of the second random number.

Also in accordance with the purposes of the invention, as embodied and broadly described, the invention recites a method of controlling an electronic game played in a system including a game server and one or more player terminals. The method includes the steps of generating a first random number at the game server; generating a second random number at the player terminal; encoding the first random number at the game server; encoding the second random number at the player terminal; transmitting a player encoded number from the player terminal to the game server; transmitting a player decoding key from the player terminal to the game server; and decoding the player encoded number at the game server to obtain the second random number.

For both the systems and methods of the invention, the invention generates a result value based on the first random number and the second random number and produces a game result based on the result value.

The invention further includes the systems and procedures of the game server and the player terminal separately and hardware and procedures for encoding, hashing, encrypting, decoding, dehashing, and decrypting the first and second random numbers. Moreover, the systems and procedures of the present invention provide for authenticating players and create audit records of game data.

As described above, in prior art activities such as gaming which were dependent on the generation of a random number by one party, issues could not be dispelled regarding the true randomness of the number and the legitimacy of the outcome dependent on the number. In the present invention, at least two parties must participate jointly in the generation of a random number, thereby dispelling any doubt and insuring the randomness of the number and any outcome dependent on that number.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the general description given above and the detailed description given below, serve to explain the principles of the invention.

FIGS. 2A and 2B are block diagrams showing exemplary database configurations;

DETAILED DESCRIPTION OF THE INVENTION

System Architecture

Figure 1:
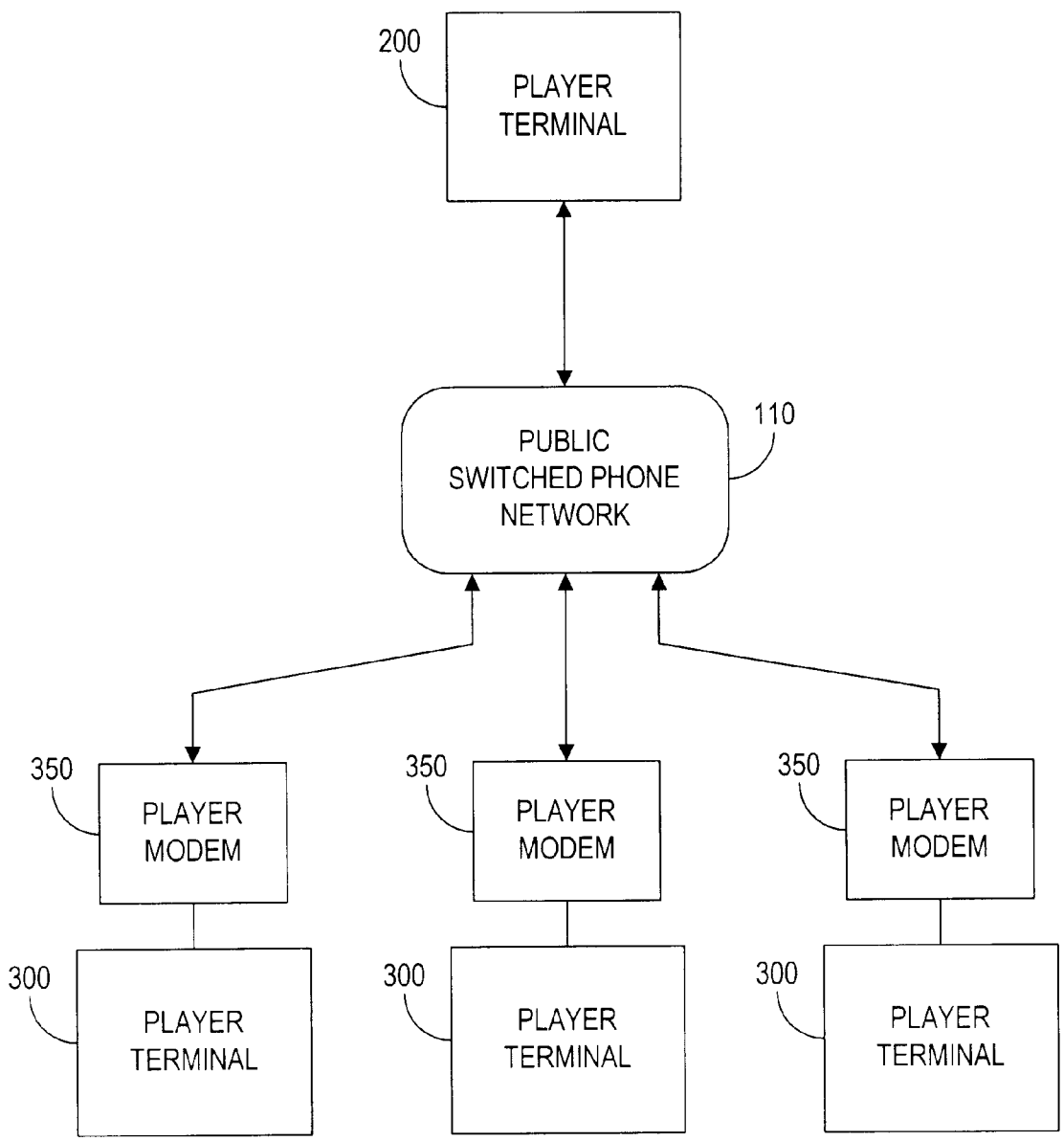
FIG. 1 is a block diagram of an electronic game system in accordance with one embodiment of the present invention.

FIG. 1 illustrates the basic system components of one embodiment of the present invention. Generally, the system comprises game server 200 and multiple player terminals 300, each with an associated player modem 350. Game server 200 preferably is connected to the player terminal modems 350 via an Internet connection using the Public Switched Telephone Network ("PTSN") 110. Alternatively, the connections may be provided by dedicated data lines, cellular, Personal Communication Systems ("PCS"), microwave, satellite networks, or any other form of data communications path.

Figure 2:
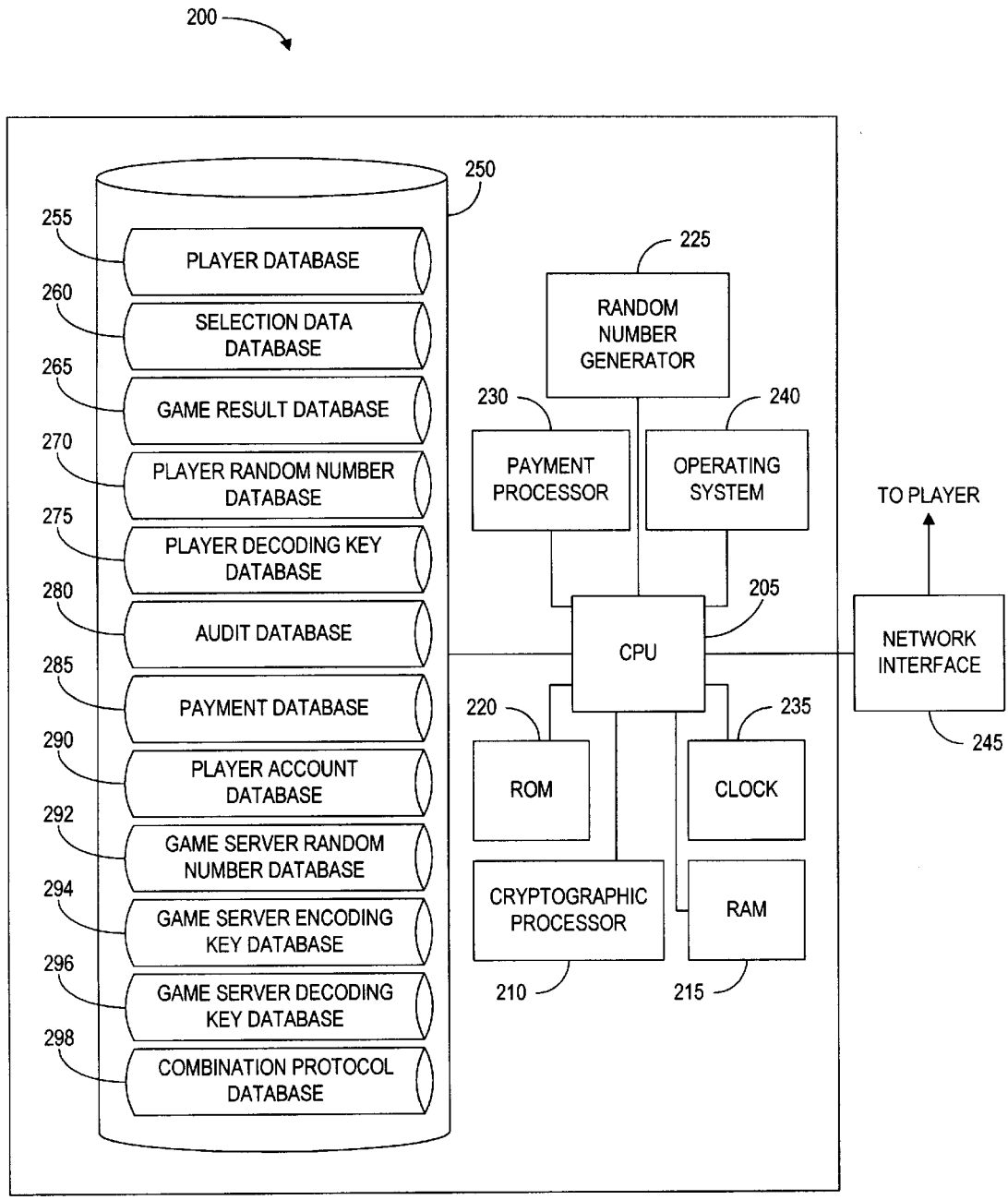
FIG. 2 is a block diagram showing one embodiment of a game server.

FIG. 2 illustrates the basic hardware and data structures of game server 200 in accordance with one embodiment of the present invention. Game server 200 includes central processor ("CPU") 205, cryptographic processor 210, random access memory ("RAM") 215, read-only memory ("ROM") 220, random number generator 225, payment processor 230, clock 235, operating system 240 (typically residing in memory as software), network interface 245, and data storage device 250. These elements are connected appropriately, for example, by a standard system bus, so as to allow communications among them.

Game server 200 is preferably capable of high volume transaction processing, performing a significant number of mathematical calculations and processing communications and database searches. In one embodiment, game server 200 comprises a conventional personal computer or computer workstation with sufficient memory and processing capability to perform the disclosed functionality. A Pentium microprocessor such as the 100 MHZ P54C, commonly manufactured by Intel Inc., may be used for CPU 205. This processor employs a 32-bit architecture. In other embodiments, game server 200 operates as a Web server, both transmitting and receiving communications to and from player terminals 300.

Cryptographic processor 210 supports the encoding and decoding of communications with players, as well as the authentication of players. An MC68HC16 microcontroller, commonly manufactured by Motorola Inc., may be used for cryptographic processor 210. This microcontroller utilizes a 16-bit multiply-and-accumulate instruction in the 16 MHZ configuration and requires less than one second to perform a 512-bit private key operation. Other exemplary commercially available specialized cryptographic processors include VLSI Technology's 33 MHz 6868 or Semaphore Communications' 40 MHZ Roadrunner 284. Alternatively, cryptographic processor 210 may be configured as part of CPU 205.

A conventional random number generating processor may be used for random number generator 225. The HEMT integrated circuit manufactured by Fujitsu, for example, is capable of generating over one billion random numbers per second. Alternatively, random number generator 225 may be incorporated into CPU 205.

Payment processor 230 supports the transfer and exchange of payments, charges, or debits. Functions performed by payment processor 230 include the preparation of on-line account statements, order-taking, credit card payment authorization, credit card settlement, automated sales tax calculations, digital receipt generation, account-based purchase tracking, and payment aggregation for low-priced services. Processing of credit card transactions by payment processor 230 may be supported with commercially available software, such as the Secure Webserver manufactured by Open Market, Inc. This server software transmits credit card numbers electronically over the Internet to servers located at the Open Market headquarters where card verification and processing is handled. Their Integrated Commerce Service provides back-office services necessary to run Web-based businesses. Payment processor 230 preferably comprises a microprocessor (such as the Intel Pentium), but alternatively may be configured as part of CPU 205.

Data storage device 250 may include hard disk, magnetic, or optical storage units, as well as CD-ROM drives or flash memory. Data storage device 250 contains databases used in the processing of transactions in the present invention, including player database 255, player selection data database 260, game result database 265, player random number database 270, player decoding key database 275, audit database 280, payment database 285, player account database 290, game server random number database 292, game server encoding key database 294, game server decoding key database 296, and combination protocol database 298. In a preferred embodiment, database software such as Oracle7, manufactured by Oracle Corporation, is used to create and manage these databases.

For illustration purposes, FIG. 2A provides a structural diagram of an exemplary player selection data database 260. As shown, selection data database 260 maintains data on selections made by a player, and includes fields for saving player ID number 261, tracking number 262, game selected 263, amount of wager 264, time of wager 266, type of wager 267, and a game result 268.

FIG. 2B illustrates another example of a database, this time, the game result database 265. As shown, game result database 265 tracks the results associated with each set of player selection data and includes fields for the player ID number 261, selection data tracking number 262, game result 268, result value 269, time of result 271, and status of payment 272.

The meaning of the information in these various fields will become more clear in the following descriptions. The other databases are organized in a similar manner, thus separate figures of each are not necessary. Player database 255 maintains data on players, and includes fields such as name, address, credit card number, phone number, ID number, social security number, electronic mail address, past system usage, public/private key information, and game preferences. This information is preferably obtained when the player first registers with the system. Player database 255 also contains the tracking number of each player selection data and player random number generated by a player.

Player random number database 270 stores all player random numbers. This database is indexed by player ID and contains fields such as player ID number, corresponding selection data tracking number, tracking number of a corresponding player decoding key, a player random number, and the time at which the player random number was received by game server 200.

Player decoding key database 275 facilitates the decoding of the player random number, storing the keys necessary to decode communications from a player. For messages encrypted using a public key encryption system such as RSA, Data Security Inc.'s player public keys will be stored in player decoding key database 275. In a symmetric key cryptographic system such as Data Encryption System ("DES"), symmetric keys are stored. Both symmetric and public keys are long strings of binary digits, and are explained more fully below with respect to cryptographic authentication embodiments.

Audit database 280 stores transactional information relating to a player and, in one embodiment, includes the time and date of each player log in, and the number of games played.

Payment database 285 tracks all payments made by the players with fields such as player name, player ID number, amount of payment, and corresponding player selection data and a game result. This database may also store credit card numbers of players or bank account information.

Player account database 290 may be established if the player wants to keep a balance of funds at game server 200 for future transactions. Player account database 290 acts as a checking account, with winnings deposited and losing wagers subtracted. Alternatively, this account may be a pointer to account data stored at the player's bank, storing only the name of the bank and the player's bank account number.

Game server random number database 292 tracks all game server random numbers generated by game server 200 and, in one embodiment, includes fields such as corresponding player selection data tracking number, player name, player ID number, the time that game server random number was generated, and the time that the game server random number was transmitted to the player.

Game server encoding key database 294 stores all encoding keys used by game server 200 to encode the game server random number.

Game server decoding key database 296 stores all decoding keys transmitted to player terminal 300 to decode the game server random numbers.

Finally, combination protocol database 298 stores the protocols used to combine a player random number with a game server random number to form a result value.

Referring again to FIG. 2, network interface 245 is the gateway to communicate with players through respective player terminals 300. Conventional internal or external modems may serve as network interface 245. Network interface 245 preferably supports modems at a range of baud rates from 1200 upward, but may combine such inputs into a T1 or T3 line if more bandwidth is required. In a preferred embodiment, network interface 245 is connected to the Internet and/or a commercial on-line service such as America Online, CompuServe, or Prodigy, allowing players access to game server 200 from a wide range of electronic connections. Several commercial electronic mail servers include the above functionality. For example, NCD Software manufactures "Post.Office," a secure server-based electronic mail software package designed to link people and information over enterprise networks and the Internet. This product is platform independent and utilizes open standards based on Internet protocols. Users can exchange messages with enclosures such as files, graphics, video, and audio. This product also supports multiple languages. Alternatively, network interface 245 may be configured as a voice-mail interface, web site, electronic Bulletin Board System ("BBS"), or electronic-mail address.

While the above embodiment describes a single computer acting as game server 200, those skilled in the art will realize that the functionality can be distributed over a plurality of computers, wherein the databases and processors are housed in separate units or locations. Some controllers perform the primary processing functions and contain at a minimum RAM, ROM, and a general processor. Each of these controllers is attached to a WAN hub which serves as the primary communication link with the other controllers and terminals. The WAN hub may have minimal processing capability itself, serving primarily as a communications router. Those skilled in the art will appreciate that an almost unlimited number of controllers may be supported.

Figure 3:
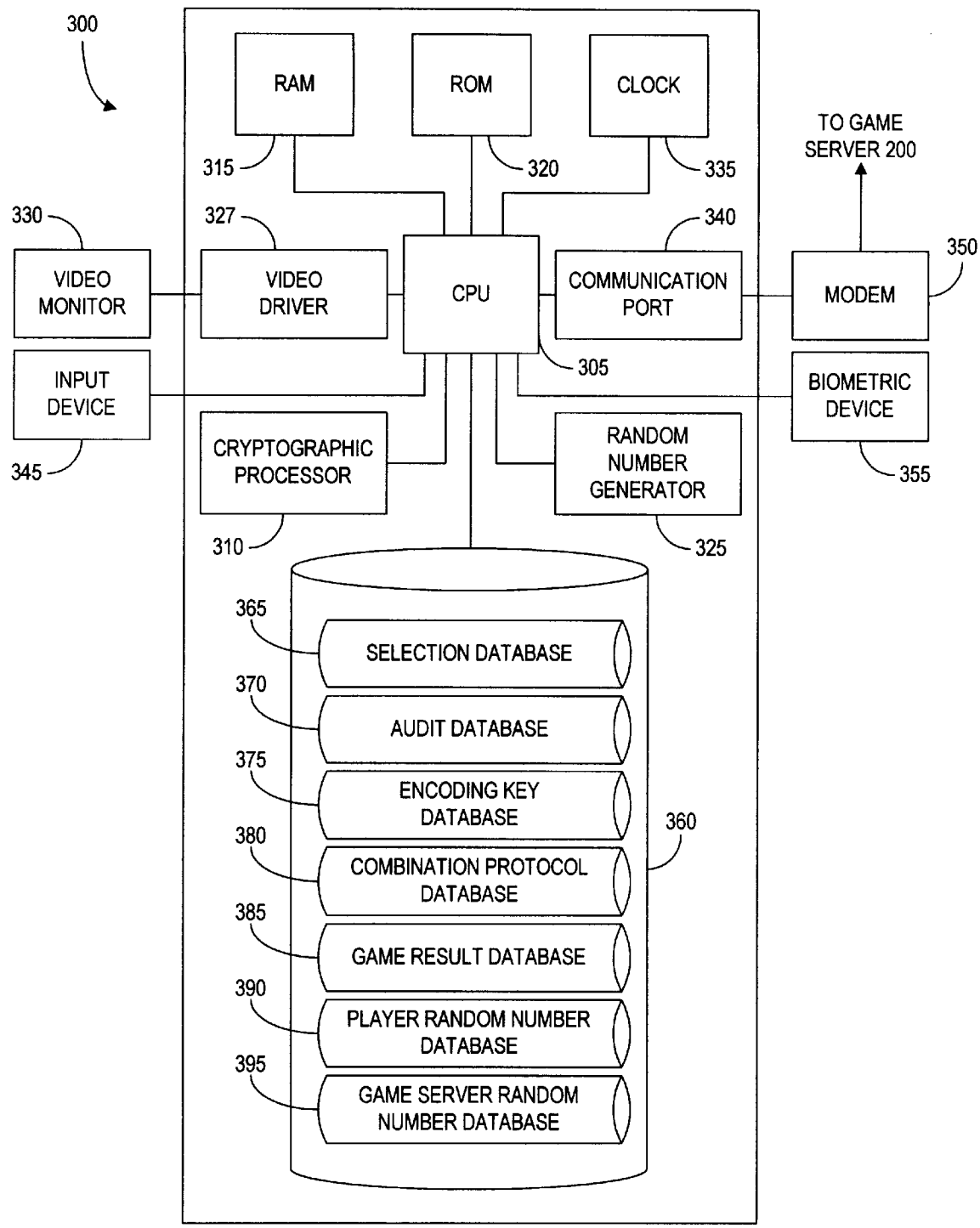
FIG. 3 is a block diagram showing one embodiment of a player terminal.

FIG. 3 illustrates the basic hardware and data structures of a player terminal in accordance with a preferred embodiment of the invention. Player terminal 300 preferably includes central processor (CPU) 305, cryptographic processor 310, RAM 315, ROM 320, random number generator 325, video driver 327, video monitor 330, clock 335, communication port 340, input device 345, modem 350, and data storage device 360. Biometric device 355 may be added for increased security, as described below with respect to cryptographic authentication embodiments. A Pentium microprocessor such as the 100 MHZ P54C described above may be used for CPU 305. A conventional random number generating processor such as the HEMT integrated circuit described above may be used for random number generator 325. Alternatively, random number generator 325 may be incorporated into CPU 305. Clock 335 is a standard chip-based clock which can serve to time stamp transactions between player terminal 300 and game server 200.

In an exemplary embodiment, player terminal 300 is a conventional personal computer having an input device, such as a keyboard, mouse, or conventional voice recognition software package. Player terminal 300 would thus interface with game server 200 via modem 350. Alternatively, player terminal 300 may be a voice-mail system, or other electronic or voice communications system. Devices such as fax machines or pagers are also suitable terminal devices.

Modem 350 may not require high-speed data transfer if most player selection data and player random numbers are text-based and not too long. For cryptographic processor 310, the MC68HC16 microcontroller described above may be used. The structure of biometric device 355 will be described in conjunction with the cryptographic authentication embodiment.

Data storage device 360 preferably comprises a conventional magnetic-based hard disk storage unit such as those manufactured by Conner Peripherals. Selection data database 365 records all selection data generated by a player, tracking games selected, type of bet, amount of wager, etc. Audit database 370 stores communications between player terminal 300 and game server 200. Encoding key database 375 stores keys used in the process of encoding communications transmitted to game server 200. Combination protocol database 380 stores the protocols used by game server 200 to combine a player random number and a game server random number. Game result database 385 stores all of the players' results, including amounts won or lost. Player random number database 390 stores each random number generated by a player. Game server random number database 395 stores all game server random numbers received from game server 200. This database may also store the corresponding decoding keys in the event that a game server random number is encoded.

Player terminal 300 communications are preferably software driven. There are many commercial software applications that can enable the communications required by player terminal 300, the primary functionality being message creation and transmission. Eudora Pro manufactured by Qualcomm Incorporated, for example, provides editing tools for the creation of messages as well as the communications tools to route the message to the appropriate electronic address. When game server 200 is configured as a Web server, conventional communications software, such as the Netscape Navigator Web browser from Netscape Communications Corporation may also be used. The player may use the Netscape Navigator browser to transmit and receive random numbers and selections.

Having described the system and component architecture, we will now consider various embodiments of the present invention to ensure the integrity of electronic games.

Mutual Encoding Embodiments

As discussed, in one embodiment of the present invention, communications between player terminal 300 and game server 200 take place via electronic networks, with game server 200 acting as a Web server.

Figure 4:
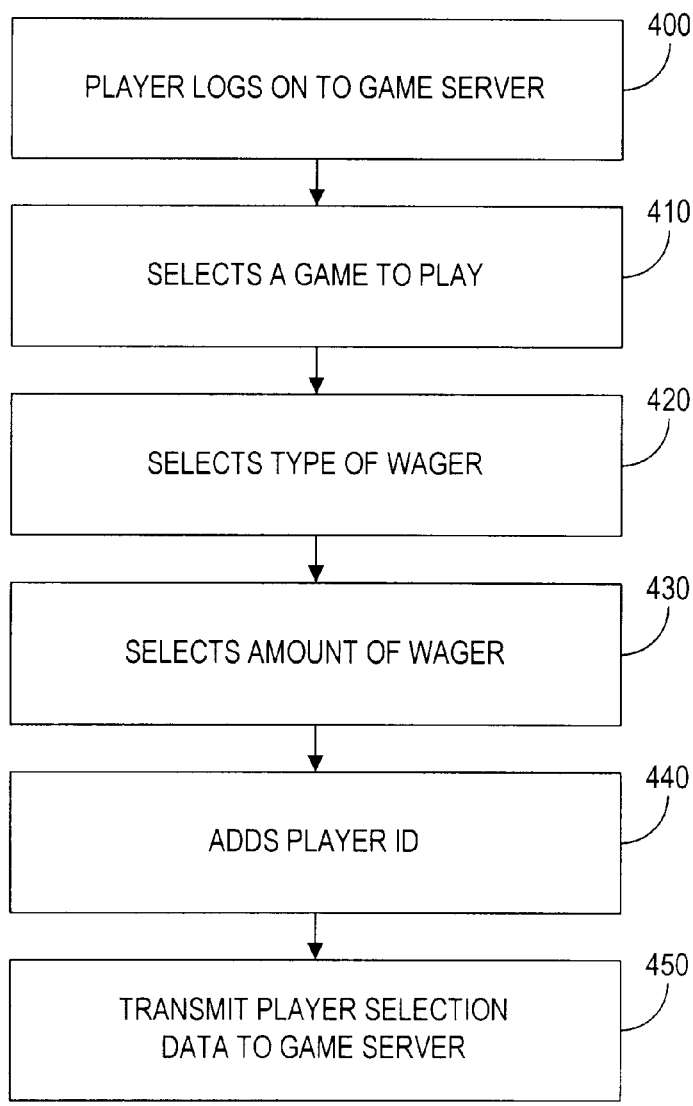
FIG. 4 is a flow chart illustrating a process by which a player transmits a selection to a game server.

FIG. 4 illustrates a process by which a player transmits a player selection to a game server. Initially, a player logs on to game server 200 using player modem 350 of player terminal 300, establishing a communication link at step 400. At step 410, the player selects the game that he wants to play by selecting from a list of possible games. The player may, for example, select a potential game from a list on a Web page by clicking on the appropriate icon or graphic. Games preferably include casino games such as blackjack, craps, roulette, baccarat, slot machines, lottery, poker, video poker, and sports betting, but may include any game in which a server generates a random number that must be trusted by a player, including raffles and prize drawings.

After the game is selected, the player selects a type of wager at step 420. The type of wager is directly related to the game selected. The type of wager for a roulette game, for example, might be a bet on "even" and a single number bet such as "18 black." For a game like blackjack, the type of wager would indicate the number of simultaneous hands the player intends to play.

At step 430, the player then selects the amount of each wager. For example, the player might bet one hundred dollars on the next blackjack hand, or may bet five dollars on the next pull of a slot machine. The player may elect to use funds from player account database 290 or may transmit payment information such as a credit card number along with the total amount wagered. At step 440, the player attaches his name or a unique player ID number to his selections, allowing game server 200 to authenticate the identity of the player. This ID number is preferably received from game server 200 when the player registers with the service or is chosen by the player and then registered with game server 200 by phone. As shown in FIG. 2A, game server 200 maintains a database of player ID numbers in player database 255 and issues (or allows) only unique numbers. If less security is required, the player's telephone number could serve as the ID number since it has the advantages of being both unique and easily remembered. If additional security is required, procedures such as those described below with respect to cryptographic authentication embodiments may be implemented.

At step 450, all of the data provided by the player is combined to form "selection data" which is transmitted to game server 200. Game server 200 then receives the player selection data and adds a tracking number before storing it in selection data database 260.

Instead of a World Wide Web-based interface, players may also transmit the selection data via electronic-mail, voice-mail, or facsimile transmissions. With voice-mail, the player calls game server 200 and leaves selection data in audio form. Selection data is then transcribed into digital text at game server 200 by a conventional audio-to-text transcriber, not shown. As described, game server 200 supports a plurality of transmission methods, allowing for a wide variety of formats of selection data.

Figure 5:
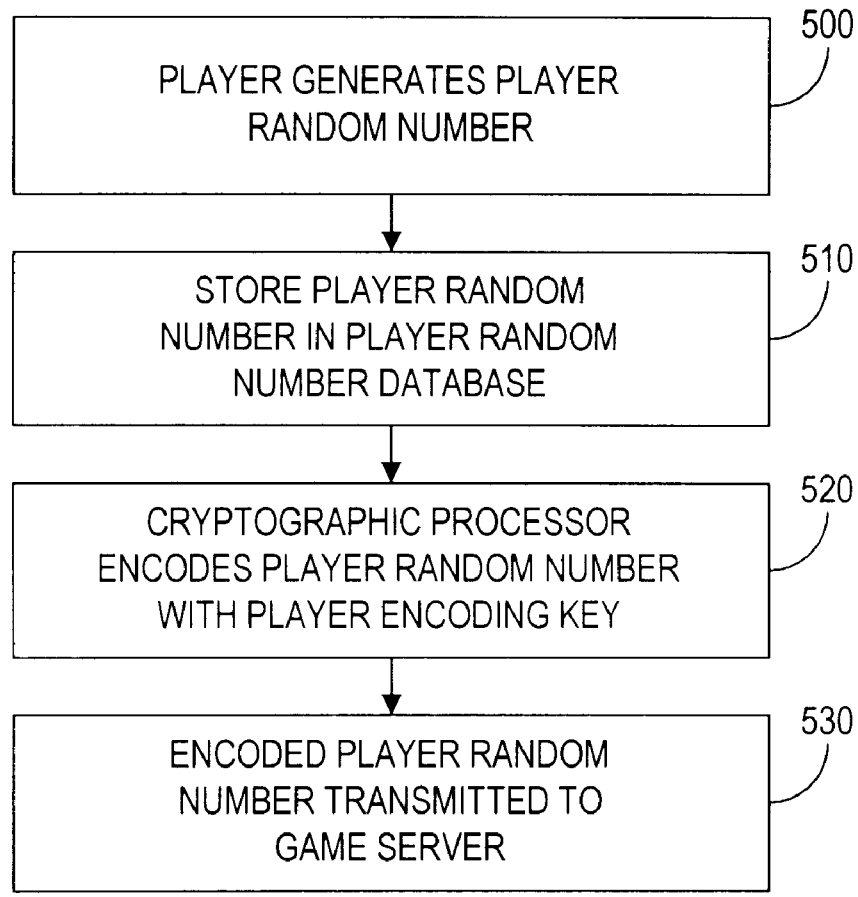
FIG. 5 is a flow chart showing a process by which a player generates and encodes a random number.

FIG. 5 illustrates a process by which a player generates and encodes a random number for use by the game server 200. At step 500, the player generates a player random number either by selecting a number himself or prompting random number generator 225 of player terminal 300 to produce the number. Although this number is preferably random, the system works equally well with any number that cannot be predicted by game server 200. Random number generator 225 may incorporate external factors such as the time between keystrokes of the player, or the current position of a computer mouse 345. At step 510, player terminal 300 stores the player random number in player random number database 390. At step 520, cryptographic processor 310 encodes the player random number using an encoding key from encoding key database 375. Because each player random number preferably uses a unique encoding key, encoding key database 375 preferably contains either a large number of unique keys or generates new encoding keys in real-time. Various methods for encoding numbers are known in the art and need not be described here in detail. For reference, one of ordinary skill in the art may refer to Bruce Schneier, Applied Cryptography, Protocols, Algorithms, And Source Code In C, (2d Ed, John Wiley & Sons, Inc., 1996).

Along with an encoded player random number, the player appends his player ID number and the tracking number (see FIG. 2A) to the corresponding selection data so that game server 200 knows to which wager the player random number should apply. This information is then transmitted to game server 200 using player modem 350 at step 530. In order to authenticate the player's identity, game server 200 extracts the player ID number from the message containing the encoded player random number and looks up the player's identity in player database 255. If further authentication is desired, the protocols of the authentication embodiments discussed below may be employed.

Figure 6:
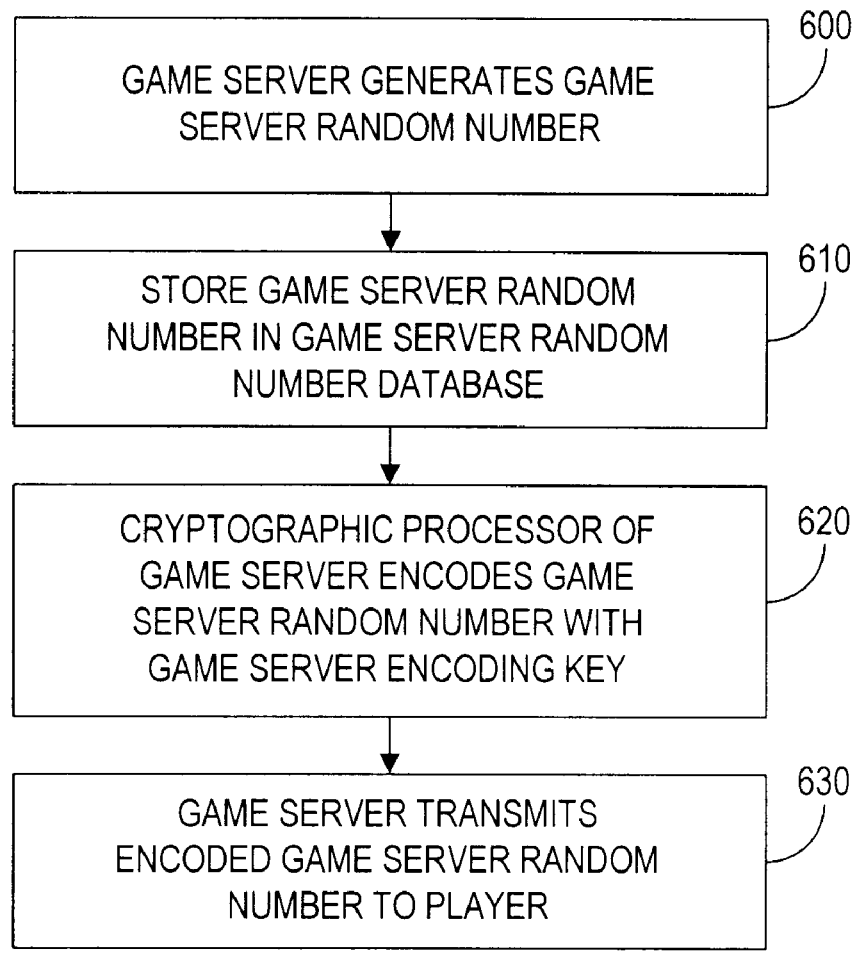
FIG. 6 is a flow chart illustrating a process by which a game server generates and encodes a random number.

FIG. 6 illustrates a procedure used by game server 200 to generate and encode a game server random number. After authenticating a player, random number generator 225 of game server 200 generates a game server random number at step 600. At step 610, the game server random number is stored in game server random number database 292. At step 620, cryptographic processor 210 of game server 200 encodes the game server random number. As with the encoding of the player random number, cryptographic processor 210 preferably has access to a large supply of unique encoding keys or an algorithm to produce them. At step 630, game server 200 then transmits encoded game server random number to player terminal 300. It should be noted that there are a number of hardware options for the receipt of the encoded game server random number at player terminal 300.

In this embodiment, the system remains secure because the random numbers have been generated and exchanged for future verification, but have not yet been decoded. As such, both parties know that the random numbers have been generated independently, ensuring a fair game result.

Figure 7:
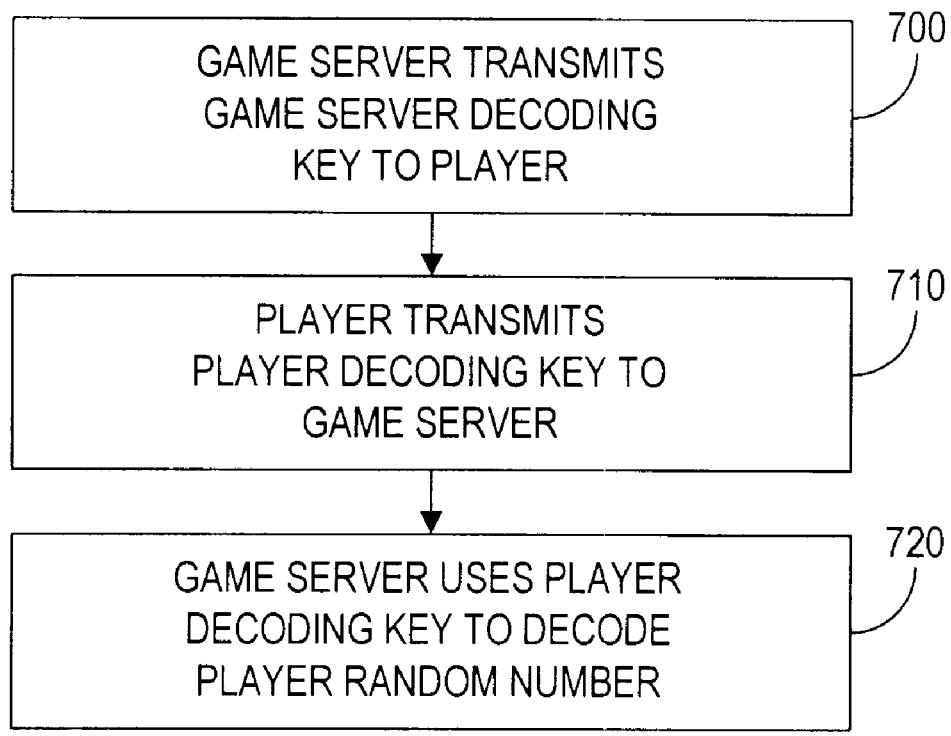
FIG. 7 is a flow chart illustrating a process of exchanging decoding keys between a player terminal and a game server.

FIG. 7 illustrates a procedure for exchanging decoding keys between the player terminal 300 and game server 200. At step 700, game server 200 (for the first time) transmits game server decoding key to player terminal 300. Like the encoding key used to encode the game server random number, the game server decoding key must be unique for each random number generated. At step 710, the player terminal 300 transmits a unique player decoding key to game server 200. In this embodiment, this exchange of decoding keys need not take place simultaneously since both parties are already in possession of each other's encoded random number. At step 720, game server 200 uses the player decoding key to decode the player random number. At this point, game server 200 now has both a player random number and a game server random number in decoded form and can use these numbers to generate a game result. The player need only decode the encoded game server random number in the event of a dispute, as described below.

Figure 8:
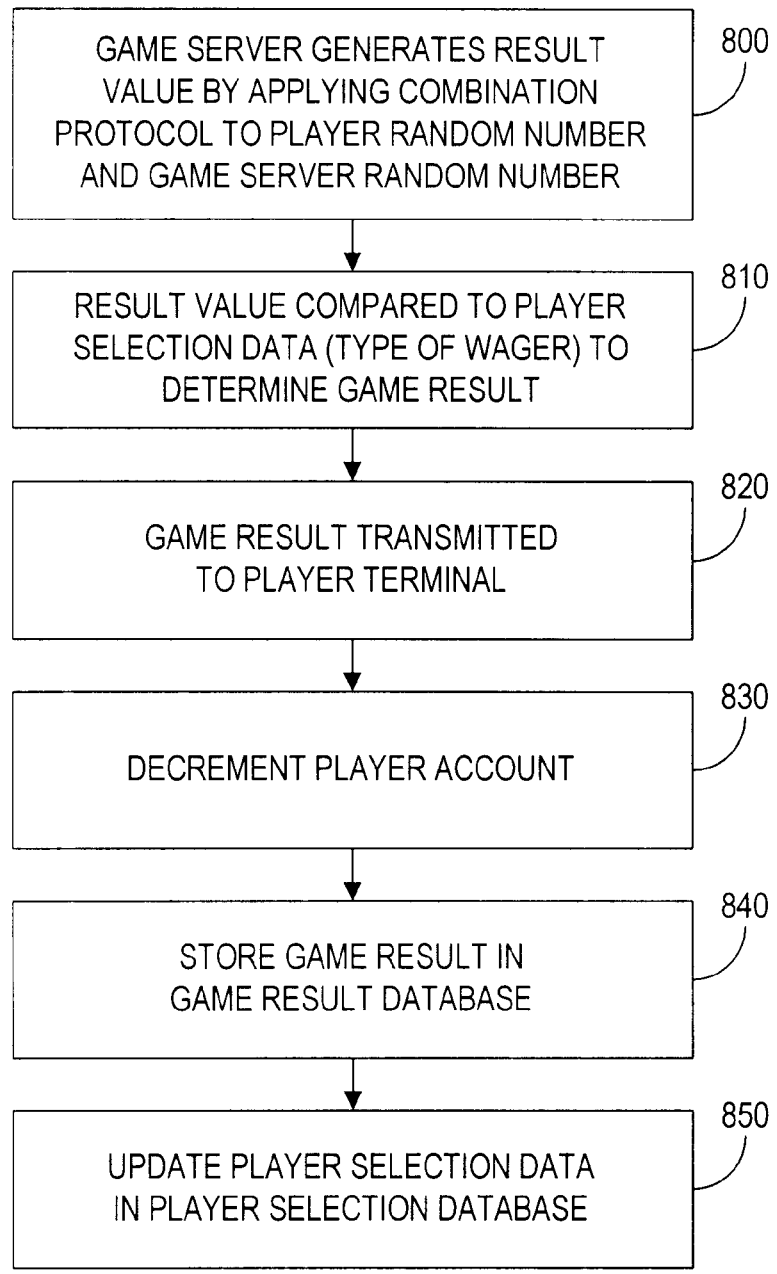
FIG. 8 is a flow chart illustrating a process of generating a game result based on a combination of a first random number and a second random number.

FIG. 8 illustrates a procedure for the game server 200 to generate a game result. As shown, game server 200 generates a game result based on the game server random number and the decoded player random number using the combination protocol from combination protocol database 298 (FIG. 2). At step 800, the combination protocol is retrieved from combination protocol database 298. The combination protocol is preferably known to both the player terminal 300 and game server 200, is unique to the particular game selected, and may be published for anyone to read. The combination protocol is preferably a series of mathematical steps which transform the player random number and the game server random number into a distinct "result value." For example, the combination protocol developed for a roulette game may indicate that the player random number and the game server random number are first multiplied together, with the resulting number squared. The remainder, after dividing this resulting number by "38, " is the "result value." The result value in this example, therefore, is an integer between "0" and "37. " For the roulette game, the integers between "0" and "37" are mapped with the set of "38" possible outcomes for the spin of a roulette wheel. Thus, the result value corresponds to the result of the spin of a roulette wheel.

At step 810, the result value is then compared to the type of wager in the player selection data in database 260 to determine a game result. For example, in the roulette example, a player making a bet on "fifteen-red" (see FIG. 2A) would lose the wager if the result value were any number other than "fifteen-red." The game result for a loss might be "lose one dollar" for a one dollar wager. At step 820, the game result is then transmitted to player terminal 300. Payment processor 230 of game server 200 then decrements player account 290 by one dollar, or charges the player's credit card one dollar (step 830), then stores the game result in game result database 265, indexed by the player ID number (step 840). For an improved audit trail, in one embodiment the game result is time stamped by clock 235 of game server 200 before being stored, or is cryptographically chained to previously stored game results. The corresponding player selection data stored in selection data database 260 is then updated to indicate that a result has been reached in step 850 (see e.g. the "result" column in FIG. 2). The player may now begin the cycle again by selecting another set of player selection data.

Using the above method, a player may be confident that the random numbers were generated independently of one another, i.e. that the player random number was generated without knowledge of the game server random number, and vice-versa. For game server 200 to cheat, it would have to decode the player random number before generating the game server random number. With knowledge of the player random number, game server 200 could select a game server random number to obtain a desired result value and, hence, game result. Obtaining the player random number before generating the game server random number, however, requires game server 200 to decode the encoded player random number, which cannot be accomplished practically before receiving the player decoding key. If the player suspects that game server 200 has cheated by not properly incorporating the player random number, he can decode the game server random number using the game server decoding key and apply the combination protocol from the combination protocol database 398 at the player terminal 300 to both random numbers, thus verifying the game result.

Single Encoding Embodiments

In another embodiment of the present invention, player terminal 300 and game server 200 again exchange random numbers. This embodiment, however, requires that only one of the parties encode its random number. The party transmitting its random number without encoding preferably waits until it has received the coded random number from the other party. This embodiment will now be discussed with reference to FIGS. 9 and 10.

Figure 9:
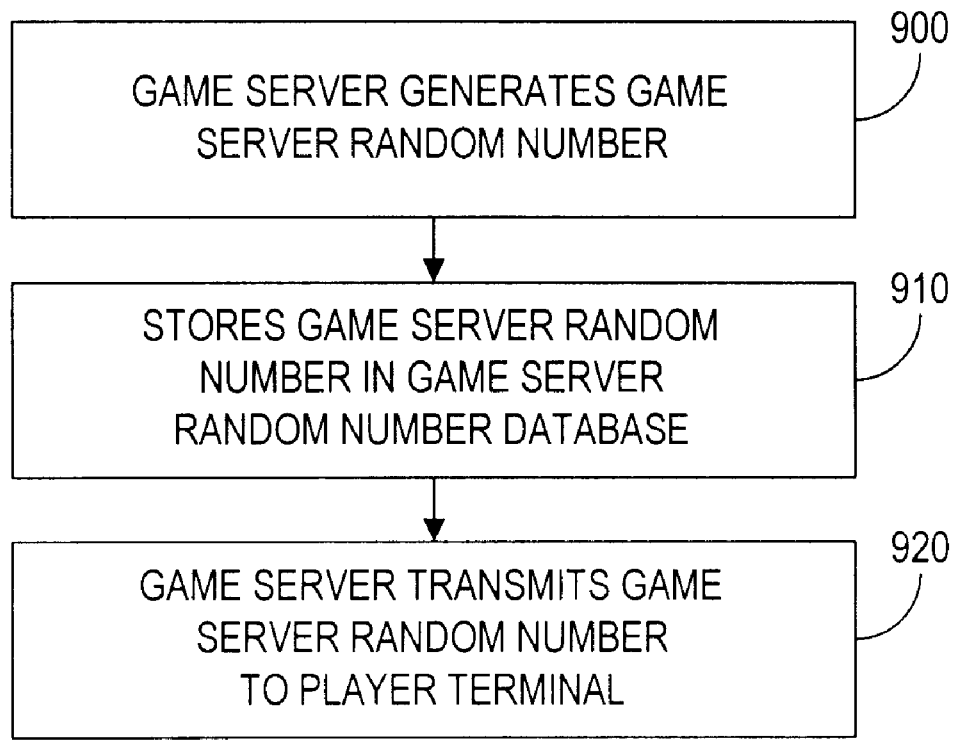
FIG. 9 is a flow chart illustrating a process at a game server of generating and transmitting a random number without encoding it.

Referring to FIG. 9, player terminal 300 has already generated a player random number, encoded it, and transmitted it to game server 200 in a manner similar to that described for the mutual encoding embodiments. At step 900, game server 200 generates a game server random number and, at step 910, stores it in game server random number database 292. At step 920, game server 200 transmits the game server random number to player terminal 300. Since no encoding takes place, however, game server 200 does not transmit a game server decoding key.

Figure 10:
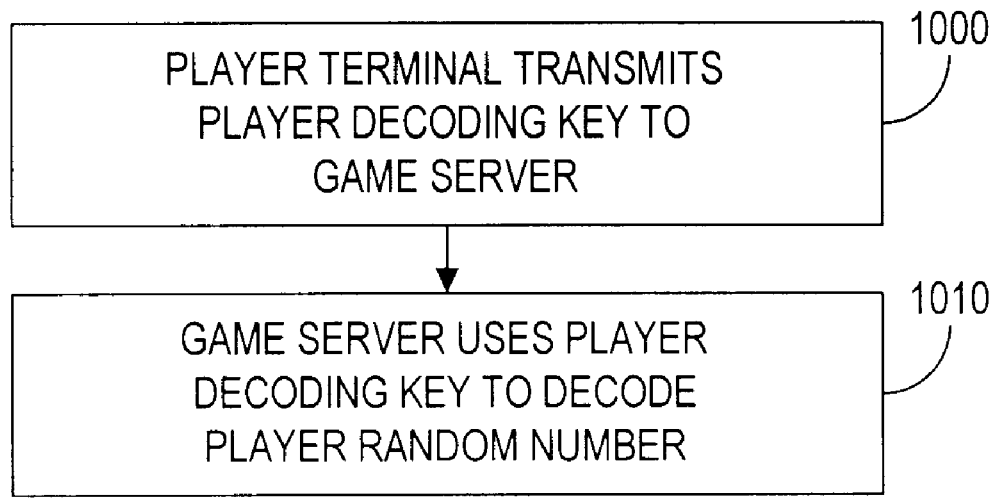
FIG. 10 is a flow chart illustrating a process of transmitting a decoding key from a player terminal to a game server and decoding a random number.

As shown in FIG. 10, after receiving the game server random number, player terminal 300 transmits a player decoding key to game server 200 at step 1000. At step 1010, game server 200 uses the player decoding key to decode the encoded player random number. At this point, each party is in possession of the other party's respective random number. The random numbers are then combined as described above to generate a game result.

In this embodiment, player terminal 300 generates and transmits encoded player random number before game server 200 generates and transmits the game server random number. Then, after receiving the game server random number, player terminal 300 transmits the decoding key for the game server 200 to decode the encoded player random number. In an alternative embodiment, game server 200 and player terminal 300 switch procedures. Specifically, game server 200 generates and transmits an encoded game server random number before player terminal 300 generates and transmits the player random number. Then, after receiving the player random number, the game server 200 transmits the decoding key for the player terminal to decode the game server random number should the player so choose.

Again, in these embodiments, both the player and the game server 200 may be confident that the player random number and the game server random number were developed independently.

Hash Value Embodiments

In this embodiment, neither player terminal 300 nor game server 200 encodes their respective random numbers. Instead, player terminal 300 generates a player random number, hashes it, sends the hash value to game server 200, and then receives the game server random number. The player terminal then transmits the player random number to game server 200, where it is hashed and then compared to the hash value previously received to determine whether it is the number originally generated by player terminal 300. Operation of this embodiment is illustrated in the flow diagrams of FIGS. 11–13.

Figure 11:
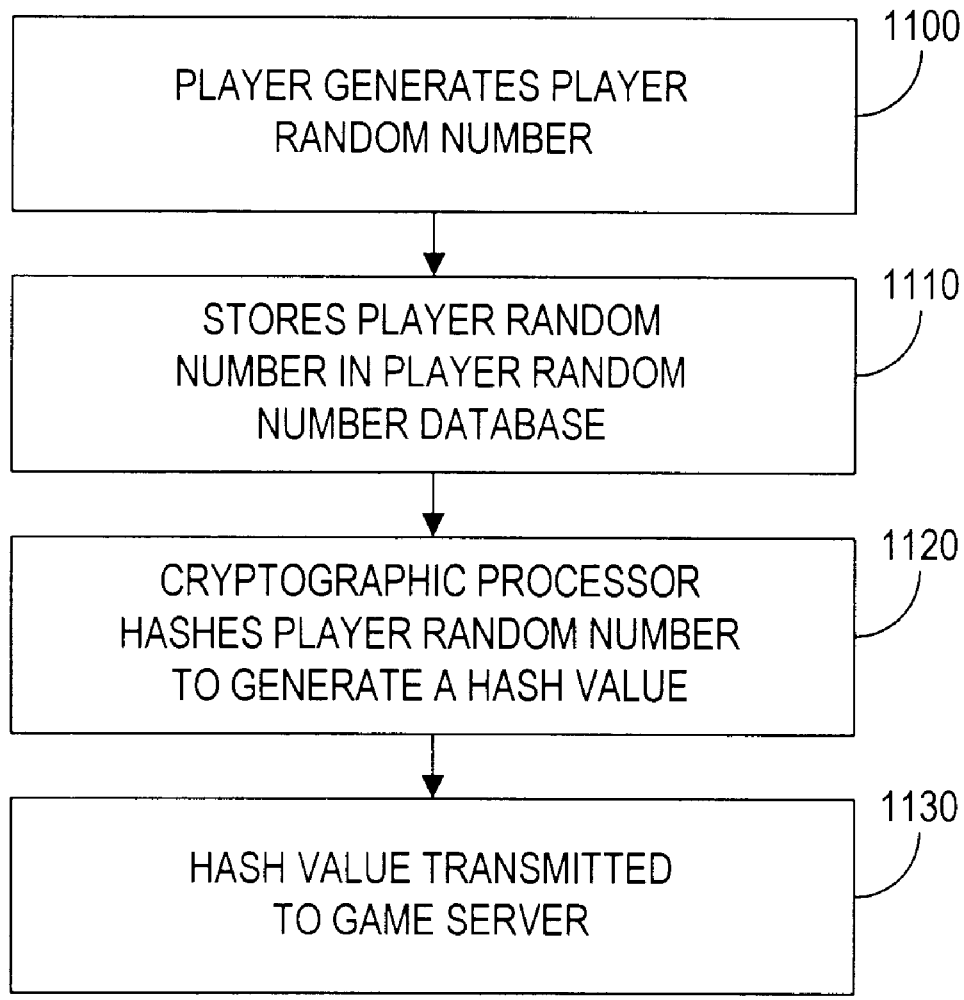
FIGS. 11 through 13 are flow charts illustrating an exemplary procedure for exchanging random numbers in which a player terminal generates a hash value of a random number.

Referring to FIG. 11, player terminal 300 has already transmitted player selection data to game server 200 as described above. At step 1100, player terminal 300 then generates a player random number as previously described. At step 1110, the player random number is stored in player random number database 390 of player terminal 300. Cryptographic processor 310 then hashes the player random number at step 1120, generating a hash value. This hash value represents a one-way transformation of the original player random number. While it is computationally simple to generate the hash value from the player random number, it is computationally unfeasible to re-create the player random number from the hash value alone. At step 1130, player terminal 300 transmits the hash value to game server 200.

Figure 12:
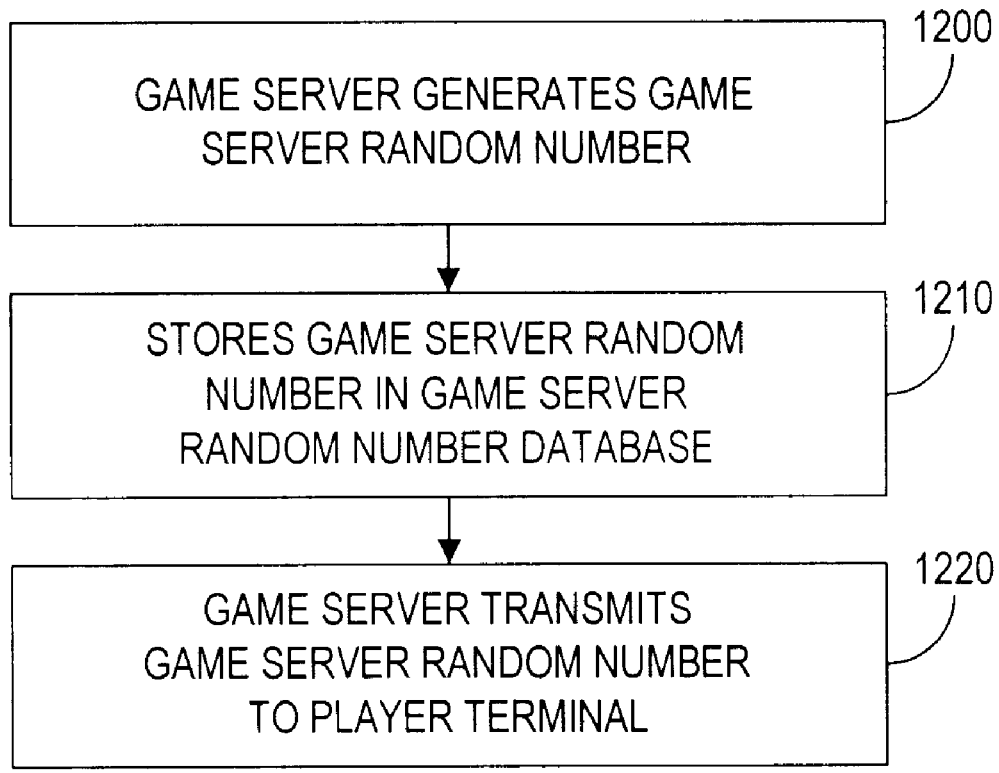

As shown in FIG. 12, game server 200 then generates a game server random number at step 1200. This number cannot be based on the player random number since, in this embodiment, game server 200 only possesses the hash value of the player random number. At step 1210, game server 200 stores the game server random number in game server random number database 292, then, at step 1220, transmits the game server random number to the player terminal.

Figure 13:
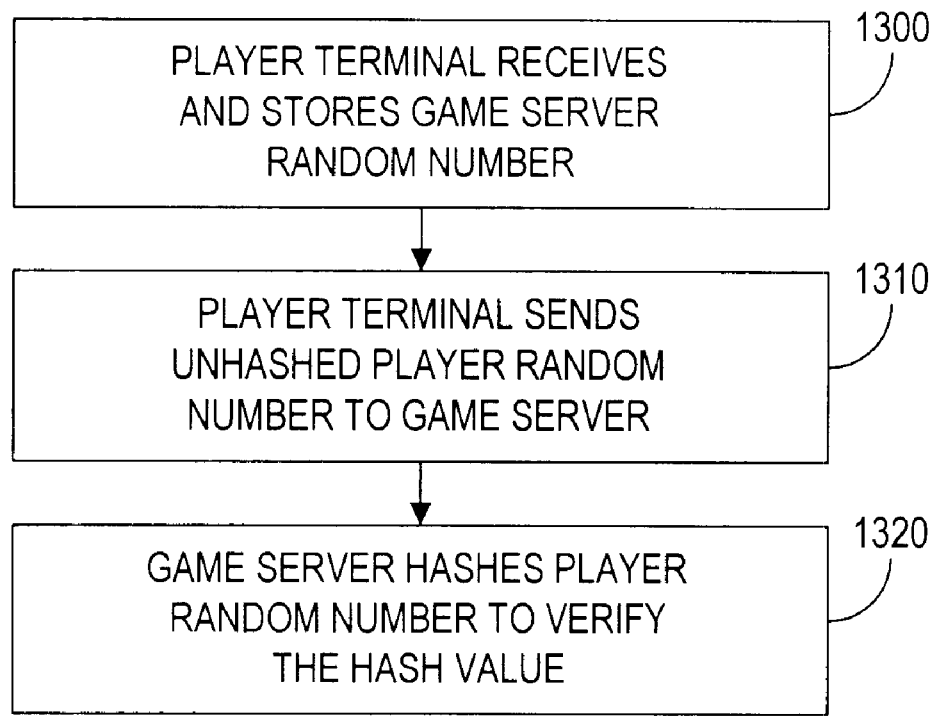

Referring to FIG. 13, player terminal 300 receives and stores the game server random number at step 1300. At step 1310, player terminal 300 then sends the unhashed player random number to game server 200. At step 1320, cryptographic processor of the game server 200 hashes the player random number, comparing the resulting hash value to the hash value received from player terminal 300. If the hash values match, then game server 200 is assured that player terminal 300 has not submitted an altered player random number. With both random numbers now in its possession, game server 200 then proceeds to generate a game result as described above.

As with the single encoding embodiments, in one embodiment of the hash value operation, the player terminal 300 generates and transmits a hash value of its random number as described above. However, in an alternative embodiment, the hash value of a random number may be generated by game server 200, in which case, the corresponding procedures of the game server 200 and player terminal are again switched.

Simultaneous Exchange Embodiments

In this embodiment, player terminal 300 and game server 200 simultaneously exchange random numbers, eliminating the need for any coding or hashing to ensure the independence of the generation of the random numbers.

Figure 14:
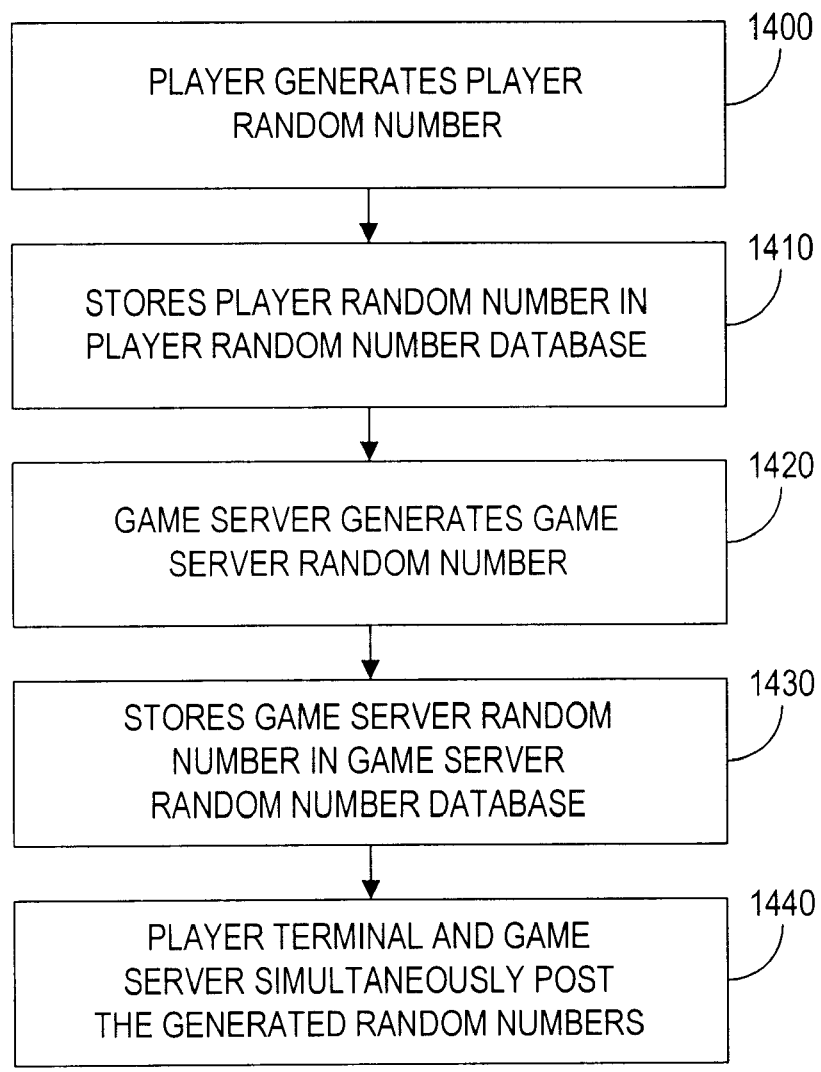
FIG. 14 is a flow chart illustrating an exemplary procedure for simultaneously exchanging random numbers between a player terminal and a game server.

FIG. 14 illustrates a procedure for this embodiment. In FIG. 14, player terminal 300 has already transmitted player selection data as described above. At step 1400, player terminal 300 generates a player random number, then stores it in player random number database 390 at step 1410. At step 1420, game server 200 generates a game server random number and, at step 1430, stores it in game server random number database 292. At step 1440, the player random number and the game server random number are simultaneously posted to an electronic bulletin board. In one embodiment, this is accomplished by setting a time at which the random numbers are to be posted. For example, both parties agree to post the random numbers at 3:00 PM, and incorporate this time into their respective communication software. At 3:00 PM, the communications software (not shown separately) automatically posts the random numbers. To deter cheating, the operating system of the electronic bulletin board could void any random number not posted within one tenth of a second of the agreed-upon posting time. This time requirement is preferably so small as to make the reverse calculations using a combination protocol computationally infeasible.

Once the player random number and the game server random number have been posted, the process for this embodiment proceeds as described above to generate a game result.

Multiple Player Embodiments

The above embodiments describe protocols in which one player interacts with game server 200. Multiple players could easily be handled by treating each player individually, with players receiving individual game results. Five roulette players, for example, could each submit player selection data and receive a game result based on a different result value. Alternatively, players could combine their player random numbers and receive a game result based on a single communal result value. In this way game server 200 more closely parallels a physical casino in which a group of players face wins or losses based on the same spin of the wheel.

As in the previously described embodiments, in multiple player embodiments, each player generates selection data describing the type of wager that they want to make. Game server 200 then generates a game server random number and encodes it using cryptographic processor 210. Each player terminal 300 generates a player random number and encodes it with its respective cryptographic processor 310. Each player terminal 300 then transmits its encoded player random number to game server 200. Once game server 200 has collected all encoded player random numbers, it transmits the encoded game server random number to each player terminal 300. After receiving the encoded game server random number, each player terminal 300 transmits its player decoding key to game server 200. Game server 200 decodes each encoded player random number and uses them to generate a game result using the combination protocol from combination protocol database 298, which may store different protocols for various numbers of players, up to the maximum number of players allowed in a game. The game result is transmitted to each player terminal 300. Players can verify the result value by exchanging decoded player random numbers with each other and comparing them with the game server random number after decoding it with a game server decoding key.

In another embodiment, each player terminal 300 generates player selection data and a player random number. The first player encodes his player random number and transmits it to the second player. The second player concatenates his random number with the encoded random number from the first player, and encodes both numbers before sending them to the third player. This process continues for each of the players. The last player sends the combined player random number to game server 200. Game server 200 creates a game server random number, encodes it, then transmits it to each player. After receiving the game server encoded random number, each player terminal 300 sends its player decoding key to game server 200. Cryptographic processor 210 of game server 200 decodes the combined player random number using these decoding keys, forms a result value, and produces a game result for each player.

Instead of the mutually encoding embodiments described above, hash algorithms, single encoding, and simultaneous exchange procedures consistent with those described above may be used to facilitate the interaction of multiple players.

Single Event Versus Multiple Event Embodiments

Outcomes for gambling games are determined by either a single event or a multiple event. Roulette and slots are good examples of single event games as a single outcome determines the game result. One spin of the roulette wheel completely resolves all bets placed on that spin. The result of a slot machine wager requires a single handle pull to determine whether the player wins or loses. In these single event games, a result value is easily compared to player selection data to determine a game result.

In multiple event games, however, a game result may be based on multiple result values. Blackjack is one example of a multiple event game. Whether a player wins a hand depends on the player's cards and the dealer's cards. Generating a single result value to represent one card is not enough. Instead, in one embodiment of the invention, a result value represents the complete sequence of fifty-two cards. Once the card sequence is defined based on the player random number and the game server random number, the cards can be dealt.

For example, after generating an encoded player random number and transmitting it to game server 200, player terminal 300 receives the encoded game server random number. Player terminal 300 then transmits a decoding key to game server 200 which generates the result value representing the complete sequence of cards in the deck. Before sending a game server decoding key to player terminal 300, game server 200 sends the player card values representing a hand of cards dealt from the sequence of cards generated by the result value. If he desires, the player then selects to draw additional cards for his blackjack hand, again, from the defined sequence of cards. Once the hand is selected, game server 200 transmits a game server decoding key to player terminal 300. It is important that the player not receive this key before making his selection to draw additional cards, since decoding the game server encoded random number would allow the payer to know the complete sequence of cards.

Another method for handling blackjack games is to generate a result value for each card dealt. After making his bet (by establishing player selection data) the player generates a series of player random numbers, exchanging them with game server 200 for each card required in the hand. The game result might therefore require seven or eight result values, each one created through the described procedures of the present invention.

Cryptographic Authentication Embodiments

In certain embodiments of the present invention, authentication of authorship of the player selection data and player random number involves checking an attached ID or name and comparing it with those stored in player database 255. In an alternative embodiment, cryptographic protocols are added to the authentication process. These protocols enhance the ability to authenticate the sender of a message and serve to verify the integrity of the communication itself, proving that it has not been altered during transmission. Encryption can also prevent eavesdroppers from learning the contents of the communication. Such techniques shall be referred to generally as cryptographic assurance methods and include the use of both symmetric and asymmetric keys as well as digital signatures and hash algorithms.

The practice of using cryptographic protocols to ensure the authenticity of senders as well as the integrity of communications is well known in the art and need not be described here in detail. Any conventional cryptographic protocols such as those described in Bruce Schneier, Applied Cryptography, Protocols, Algorithms, And Source Code In C, (2d Ed, John Wiley & Sons, Inc., 1996), could be used in accordance with the present invention and would be executed by cryptographic processor 210.

Figure 15:
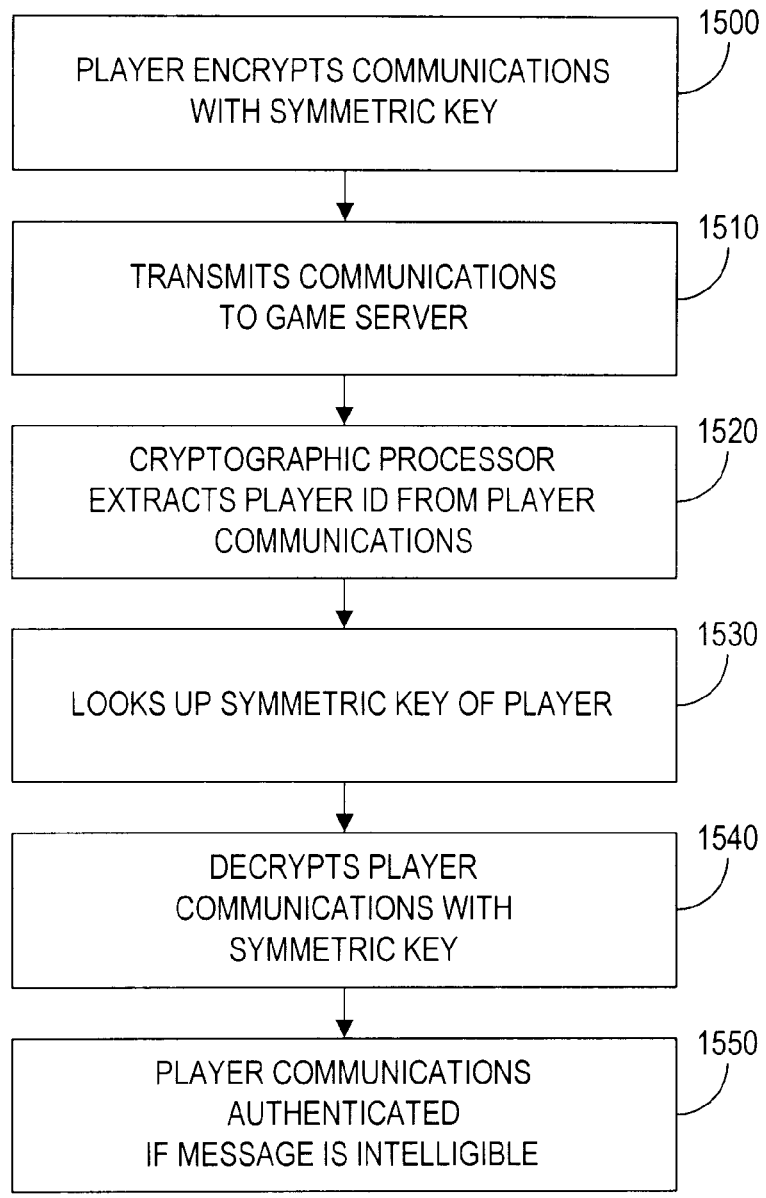
FIG. 15 is a flow chart illustrating an exemplary procedure for encoding and decoding a player communication using a symmetric key.

FIG. 15 illustrates a symmetric key embodiment in which player terminal 300 and game server 200 share a key. Thus, both encryption and decryption of the player selection data and player random number (also referred to separately or together as a player communication) are performed with the same key. This encryption may be implemented with an algorithm such as DES (U.S. Government standard, specified in FIPS PUB 46), or with any of several algorithms known in the art such as IDEA, Blowfish, RC4, RC2, SAFER, etc.

Initially, a player encrypts his communication with his assigned symmetric key at step 1500, using cryptographic processor 310 of player terminal 300. The key may be stored in encoding key database 375 or otherwise stored or memorized by the player. The player communication is then transmitted to cryptographic processor 210 of game server 200 at step 1510. Cryptographic processor 210 extracts the player ID from the player communication (step 1520), looks up the symmetric key of the player in player database 255 (step 1530), and decrypts the player communication with this key (step 1540). Game server encoding key database 294 contains algorithms and keys for encrypting, decrypting, and/or authenticating communications. At step 1550, the cryptographic processor 210 determines if the resulting communication is intelligible. If so, then the communication must have been encrypted by the same key, authenticating that the player must have indeed been the author of the message. It will be understood that these cryptographic techniques are employed to protect the security of the communications, in addition to the appropriate random number encryption technique described above.

This procedure makes it difficult for an unauthorized player to represent himself as a legitimate player. Without cryptographic procedures, an unauthorized player who obtained a sample communication from a legitimate player might be able to extract the player ID and then attach this ID number to unauthorized communications. When player communications are encrypted with a symmetric key, however, an unauthorized player obtaining a sample player communication only discovers the player's ID number, not the symmetric key. Without this key, the unauthorized player cannot create a player communication that will fool game server 200, since he cannot encrypt his communication in the same way that the authorized player could. The symmetric key protocol also ensures that the player communication has not been tampered with during transmission, since alteration of the communication requires knowledge of the symmetric key. An encrypted player communication also provides the player with more anonymity.

Figure 16:
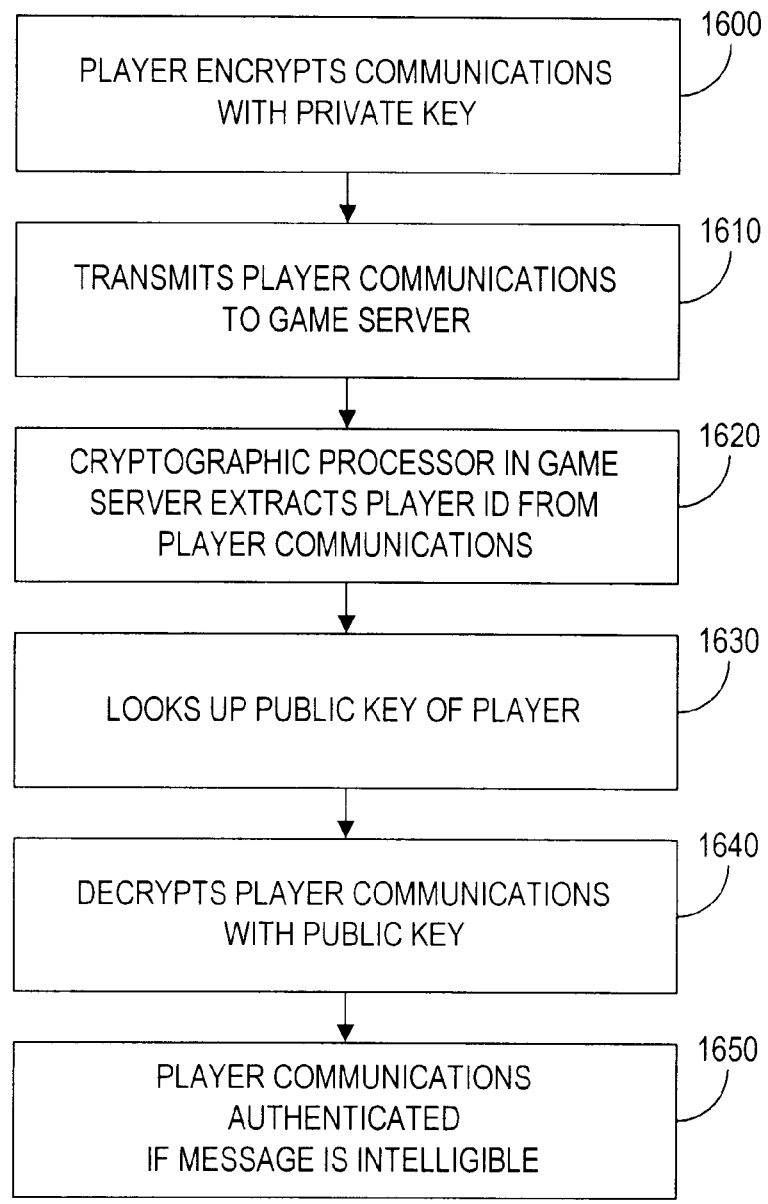
FIG. 16 is a flow chart illustrating an exemplary procedure for encoding and decoding a player communication using asymmetric keys.

FIG. 16 illustrates an asymmetric key protocol in which a player communication is encrypted with a private key and decrypted with a public key. Two such algorithms for asymmetric key protocols are the RSA algorithm and the Digital Signature Algorithm ("DSA"). At step 1600, player terminal 300 encrypts the player communication with the player's private key using cryptographic processor 310. Player terminal 300 then transmits the player communication to game server 200 at step 1610. Cryptographic processor 210 at game server 200 then extracts the player ID at step 1620, looks up the player's associated public key in player database 255 at step 1630, and decrypts the communication with this public key at step 1640. As before, if the player communication is intelligible then game server 200 has authenticated the player at step 1650. Again, unauthorized players obtaining the player communication before it is received by game server 200 are not able to undetectably alter it since they do not know the private key of the player. Unauthorized players might, however, be able to read the message if they managed to obtain the public key of the player. Communication secrecy is obtained if the player encrypts the player communication with his public key, requiring the unauthorized player to know the player's private key to view the player communication.

Figure 17:
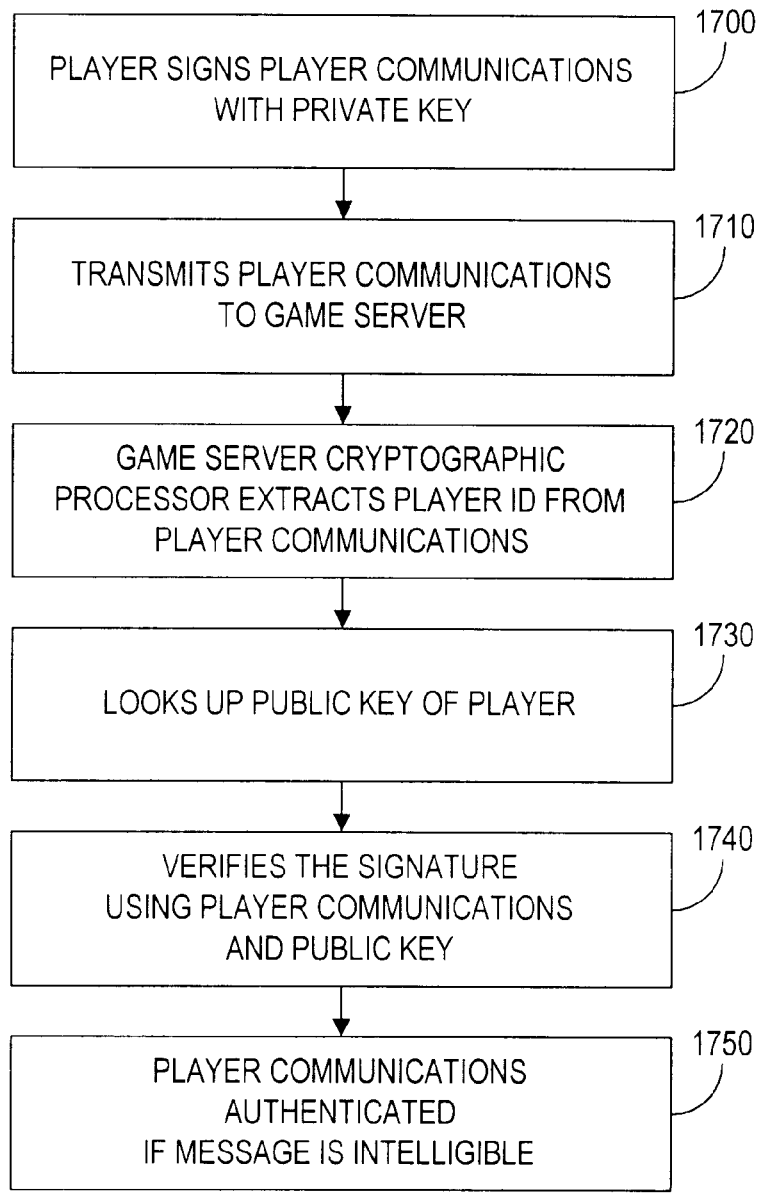
FIG. 17 is a flow chart illustrating an exemplary procedure for providing authentication and message integrity.

FIG. 17 shows a cryptographic technique using digital signatures to provide authentication and message integrity. One such algorithm is DSA. As in the asymmetric protocol described above, each player has an associated public and private key. The player signs his communication with his private key at step 1700 with cryptographic processor 310 and transmits it to game server 200 at step 1710. At game server 200, cryptographic processor 210 extracts the player ID at step 1720 and looks up the player's public key at step 1730, verifying the signature using the communication and the public key of the player at step 1740. If the communication is intelligible, then game server 200 accepts the communication as authentic at step 1750.

Figure 18:
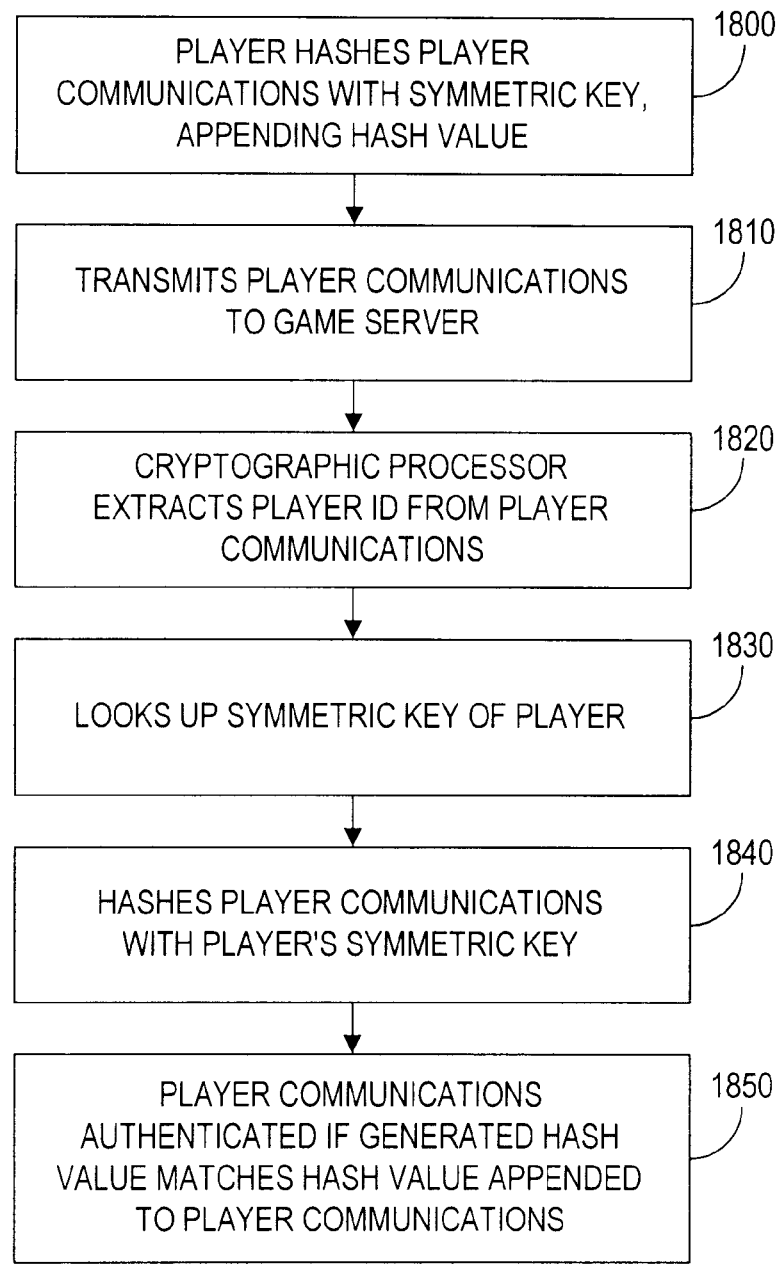
FIG. 18 is a flow chart illustrating another exemplary procedure for providing authentication and message integrity.

Referring now to FIG. 18, there is illustrated a cryptographic technique using message authentication codes for verifying the authenticity and integrity of a player communication. In the hash protocol of the present invention, player terminal 300 and game server 200 share a symmetric key, which the player includes in a hash of the communication at step 1800. In the hash protocol, a one-way function is applied to the digital representation of the communication. Any of the MAC algorithms, such as RIPE-MAC, IBC-Hash, CBC-MAC, and the like may be applied in this application. After transmitting the communication to game server 200 at step 1810, cryptographic processor 210 of game server 200 extracts player ID from the player communication at step 1820. Then cryptographic processor 210 looks up the player's symmetric key at step 1830 and hashes the communication with the symmetric key at step 1840, comparing the resulting hash value with the hash value attached to the communication. If the values match at step 1850, the integrity of the communication is verified along with the authenticity of the player.

Although cryptographic techniques can provide greater confidence in the authenticity of player communications, they are useless if the player's cryptographic keys are compromised. An unauthorized player who obtains the symmetric key of another player is indistinguishable from that player in the eyes of game server 200. There is no way to know whether the player was the true author of the communication, or an unauthorized player with the right cryptographic keys. In one embodiment, biometric device 355 (FIG. 3) such as a fingerprint reader, voice recognition system, retinal scanner, or the like help to solve this problem. A biometric device incorporates a physical attribute of the player into a communication, which is then compared with the value stored in player database 255 at game server 200.

Fingerprint verification, for example, may be executed before the creation of a communication, during the generation of a communication in response to prompts from game server 200, at some predetermined or random time, or continuously by incorporating the scanning lens into player terminal 300 and requiring the player to maintain a finger on the scanning lens at all times for continuous verification while the communication is generated.

An example of such a biometric device is the FC100 FINGERPRINT VERIFIER available from Startek, a Taiwanese company. The FC100 is readily adaptable to any PC via an interface card. The fingerprint verifier utilizes an optical scanning lens. The player places a finger on the lens, and the resulting image is scanned and digitized, and the data compressed and stored in memory. Typically, a 256 byte file is all that is required. Each live-scan fingerprint is compared against the previously enrolled/stored template, stored in data storage device 360. If the prints do not match, the cryptographic algorithms executed by cryptographic processor 310 may prevent the player from generating a communication.

In a voice verification embodiment, the player's voice is used to verify his identity. This embodiment has the advantage of not requiring the use of any specialized hardware since it can be implemented over a standard phone connection. The player's identity is verified at game server 200. The process of obtaining a voice-print and subsequently using it to verify a person's identity is well-known in the art, and therefore need not be described in detail. Conventional speaker identification software samples the player's voice. This sample is stored at game server 200 in player database 255. Each time the player wants to transmit a communication to game server 200, he is required to call game server 200 and speak into the phone at the prompt for a voice sample. If this sample matches that stored in player database 255, the player is provided a password which is incorporated into the digital signature appended to his communication. Any communication received without an appropriate voice match password is not accepted. The voice-print may also be stored in a database within data storage device 360 of player terminal 300, to verify the player's identity locally prior to allowing his communication to be created.

Anonymous Transactions Embodiments

As mentioned previously, the present invention allows for the anonymity of players. Such anonymity is accomplished by eliminating all references to the names of the players for all communications. A player, for example, would include his ID in the player selection data, rather than his name, preventing eavesdroppers from discovering the player's identity. To prevent detection of a player's ID stored in player database 255, the ID numbers are preferably encrypted with the public key of game server 200.

As an additional protection of identity, the player may communicate with game server 200 through conventional anonymous remailers found on the Internet.

Payment Embodiments

While the invention can be implemented without provisions for payment features, there are many methods by which the providers of the foregoing systems could derive a revenue stream. In one embodiment, a flat fee is charged for every set of player selection data submitted. In other embodiments, flat fees would cover any number of sets of player selection data over a given period of time, allowing players to subscribe to the service much as they would subscribe to a newspaper. In another embodiment, advertisers pay to have messages listed along with the Web pages for the player selection data, supplementing the costs of operating the system.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. An electronic game system comprising a game server and one or more player terminals,
    wherein said one or more player terminals include:
        a first random number generator; and
        first transmitting means for transmitting said first random number to said game server at substantially the same time as a second random number is received; and
    wherein said game server includes:
        a second random number generator; and
        second transmitting means for transmitting said second random number to said one or more player terminals at substantially the same time as said first random number is received,
    said system including means for generating a game result based on said first random number and said second random number.

2. An electronic game system according to claim 1, wherein said player terminal further comprises:
    means for generating a hash value of said first random number;
    means for transmitting said hash value to said game server before receiving said second random number from said game server; and
    means for transmitting said first random number to said game server after receiving said second random number from said game server.

3. An electronic game server according to claim 1, wherein said game server further comprises:
    means for generating a hash value of said second random number;
    means for transmitting said hash value to said player terminal before receiving said first random number from said player terminal; and
    means for transmitting said second random number to said player terminal after receiving said first random number from said player terminal.

4. An electronic game server according to claim 1, further comprising:
    means at said player terminal for encrypting said first random number or other player selection data using a first encryption key;
    a database at said game server storing at least one decryption key corresponding to said first encryption key; and
    means at said game server for decrypting said first random number or said other player selection data using said at least one decryption key.

5. An electronic game server according to claim 1, further comprising:
    means at said player terminal for encrypting said first random number or other player selection data using a private encryption key; and
    means at said game server for decrypting said first random number or said other player selection data using a public decryption key.

6. An electronic game system as defined in claim 1, wherein said one or more player terminals further include encoding means for encoding said first random number; and wherein said game server further includes decoding means for decoding said encoded first random number.

7. An electronic game system according to claim 6 said player terminal further comprising:
    means for generating a decoding key; and
    means for transmitting said encoded first random number to said game server before receiving said second random number from said game server and for transmitting said decoding key to said game server after receiving said second random number from said game server.

8. An electronic game system as defined in claim 1, wherein said game server further includes encoding means for encoding said second random number.

9. An electronic game system as defined in claim 8, wherein said one or more player terminals further include:
    decoding means for decoding said encoded second random number.

10. An electronic game system according to claim 8, said game server further comprising:
    means for generating a decoding key; and
    means for transmitting said encoded second random number to said player terminal before receiving said first random number from said player terminal and for transmitting said decoding key to said player terminal after receiving said first random number from said player terminal.

11. An electronic game system according to claim 9, further comprising:
    means for exchanging decoding keys between said game server and said player terminal to decode said second random number.

12. In an electronic game environment having a game server and a player terminal, a method of controlling an electronic game, comprising the steps of:
    generating a first random number at said player terminal;
    generating a second random number at said game server; and
    transmitting said first random number to said game server and transmitting said second random number to said player terminal at substantially the same time.

13. A method according to claim 12, further comprising the step of:
    posting said first and second random numbers to an electronic network.

14. A method of according to claim 13, further comprising the step of:

attesting to the veracity of said posted numbers by a third party.

15. A method according to claim 13, further comprising the steps of:

transmitting player identifying information to said game server; and authenticating at said game server said player identifying information.

16. A method according to claim 15, further comprising the step of:

creating an audit record including said player identifying information, said first random number, said second random number, and a game result.

17. A method according to claim 16, further comprising the step of:

storing said audit record at a location separate from said game server.

18. In a game server for an electronic game environment having a game server and a player terminal, a method of controlling an electronic game, comprising the steps of:

generating a first random number;

receiving a second random number from said player terminal; and transmitting said first random number to said player terminal at substantially the same time that said second random number is received from said player terminal.

19. The method of claim 18, further comprising:

generating a game result based on said first number and said second number.

20. The method of claim 18, further comprising:

transmitting said game result to said player terminal.

21. In a player terminal of an electronic game environment having a game server and a player terminal, a method of obtaining a game result, comprising the steps of:

generating a first random number;

receiving a second random number from said game server;

transmitting said first random number to said game server at substantially the same time that said second random number is received from said game server; and receiving a game result from said game server, said game result being based on said first and second random numbers.

22. A device to control an electronic game for use in a game server for an electronic game environment having a game server and a player terminal, comprising:

a processor; and a storage device coupled to said processor and storing instructions adapted to be executed by said processor to:

generate a first random number;

receive a second random number from said player terminal; and transmit said first random number to said player terminal at substantially the same time that said second random number is received from said player terminal.

23. The method of claim 22, said storage device further storing instructions adapted to be executed by said processor to generate a game result based on said first number and said second number.

24. The method of claim 22, said storage device further storing instructions adapted to be executed by said processor to transmit said game result to said player terminal.

25. A medium storing instructions adapted to be executed by a processor to perform a method of controlling an electronic game for use in a game server for an electronic game environment having a game server and a player terminal, said method comprising:

generating a first random number;

receiving a second random number from said player terminal; and transmitting said first random number to said player terminal at substantially the same time that said second random number is received from said player terminal.

26. The medium of claim 25, wherein said method further comprises:

generating a game result based on said first number and said second number.

27. The medium of claim 25, wherein said method further comprises:

transmitting said game result to said player terminal.

28. A device to obtain a game result for use in a player terminal of an electronic game environment having a game server and a player terminal, comprising:

a processor; and a storage device coupled to said processor and storing instructions adapted to be executed by said processor to:

generate a first random number;

receive a second random number from said game server;

transmit said first random number to said game server at substantially the same time that said second random number is received from said game server; and receive a game result from said game server, said game result being based on said first and second random numbers.

29. A medium storing instructions adapted to be executed by a processor to perform a method of obtaining a game result for use in a player terminal of an electronic game environment having a game server and a player terminal, said method comprising:

generating a first random number;

receiving a second random number from said game server;

transmitting said first random number to said game server at substantially the same time that said second random number is received from said game server; and receiving a game result from said game server, said game result being based on said first and second random numbers.

* * * * *